(12) United States Patent
Gant

(10) Patent No.: US 6,183,334 B1
(45) Date of Patent: Feb. 6, 2001

(54) WHISTLE

(76) Inventor: Jack R. Gant, 13158 Cholla Dr., Kuna, ID (US) 83634

(*) Notice: Under 35 U.S.C. 154(b), the term of this patent shall be extended for 0 days.

(21) Appl. No.: 09/307,869

(22) Filed: May 10, 1999

(51) Int. Cl.[7] ....................................... A63H 5/00
(52) U.S. Cl. ............................... 446/204; 446/81
(58) Field of Search ............................ 446/81, 202, 204, 446/213; 116/137 A, 137 R

(56) References Cited

U.S. PATENT DOCUMENTS

| | | |
|---|---|---|
| 229,163 | 6/1880 | Mills . |
| 267,562 | 11/1882 | Mills . |
| 452,706 | 5/1891 | Hoops . |
| 530,039 | 11/1894 | Gardiner . |
| 532,642 * | 1/1895 | Crowell . |
| 1,168,967 * | 1/1916 | Savart . |
| 1,567,284 | 12/1925 | Miller . |
| 1,609,791 | 12/1926 | Broadwell . |
| 2,417,480 | 3/1947 | Friedman . |
| 2,617,324 | 11/1952 | Brody ..................................... 84/330 |
| 2,619,865 | 12/1952 | Lynch ..................................... 84/330 |
| 2,739,065 | 3/1956 | Hugin ..................................... 99/138 |
| 2,754,714 * | 7/1956 | Folsom . |
| 3,131,590 * | 5/1964 | Lee . |
| 3,415,009 | 12/1968 | Knauf . |
| 4,821,670 * | 4/1989 | Foxcroft et al. .................. 116/137 R |
| 5,201,276 | 4/1993 | Knight .................................. 116/137 |

FOREIGN PATENT DOCUMENTS

| | | |
|---|---|---|
| 136866 | 11/1947 | (AT) . |
| 241974 | 11/1925 | (GB) . |

* cited by examiner

Primary Examiner—Jacob K. Ackun
Assistant Examiner—Jeffrey D. Carlson
(74) Attorney, Agent, or Firm—Jack C. Munro

(57) ABSTRACT

A whistle that is constructed of a body, preferably of an edible material such as candy, which includes a through air entry hole which is located transversely within the body with this air entry hole connecting to an air exhaust chamber which is located longitudinally within the body. The air exhaust chamber terminates at an air exhaust opening formed within the top surface of the body. The air exhaust chamber is triangularly shaped and tapered to be narrowest at its pointed tip. The body may be mounted on a supporting stick.

7 Claims, 1 Drawing Sheet

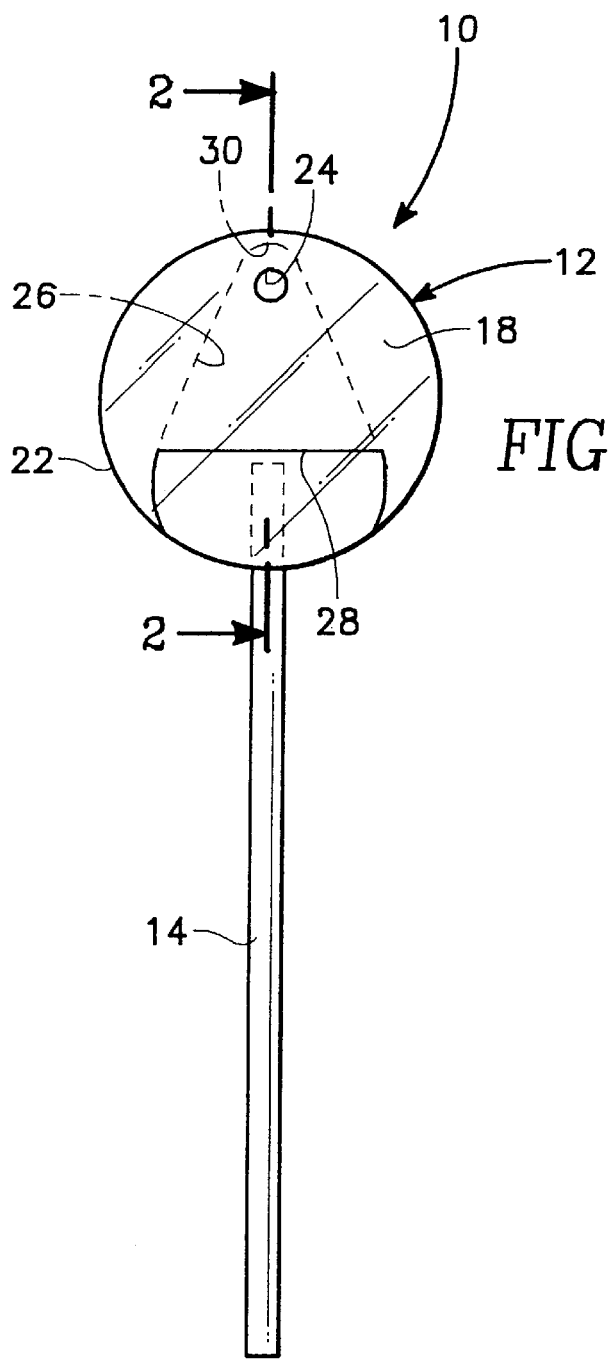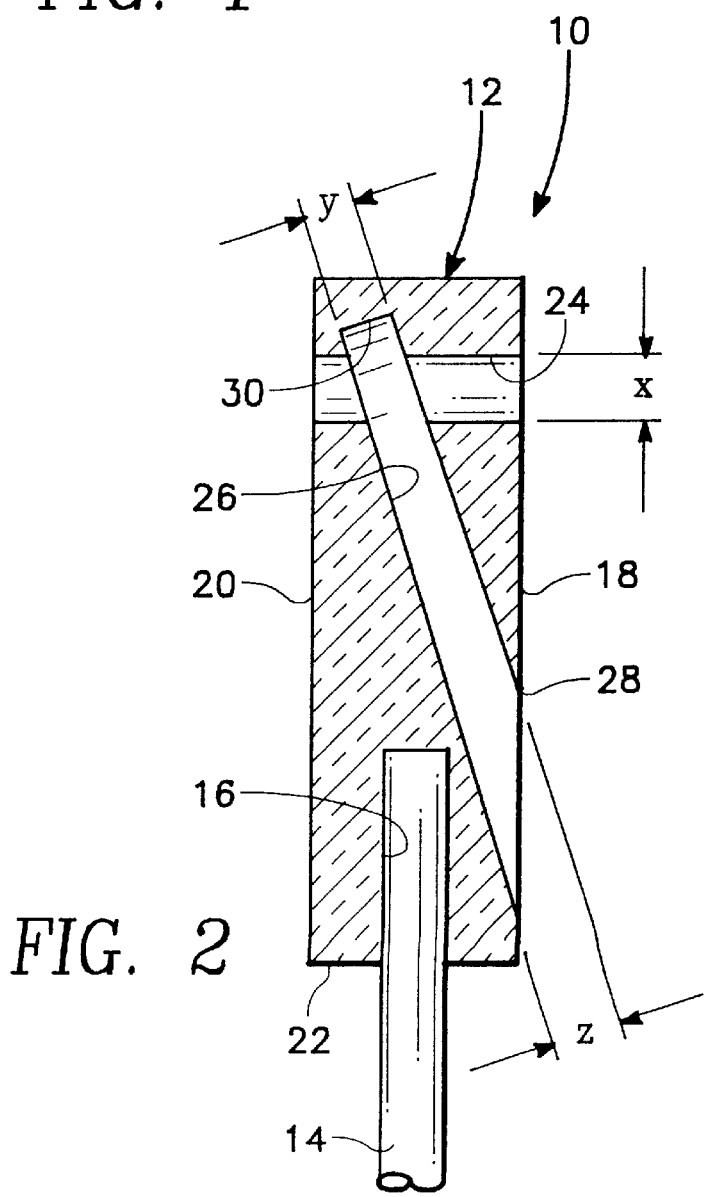

WHISTLE

BACKGROUND OF THE INVENTION

1). Field of the Invention

The field of this invention is directed to whistles designed to be placed within the mouth of a human and used to produce a high pitched shrill sound by blowing air through the whistle.

2). Description of the prior Art

The construction of whistles has long been known also the construction of whistles out of a confectionery product, such as hard candy, has long been known. However, heretofore, whistles constructed of the prior art have not been designed in such a way as to maximize the creation of a high pitched shrill sound.

Whistles are commonly used as a self entertainment device. However, whistles do have utility in that they may be used as a means of getting someone's attention located at some distance away from the whistler. Also, whistles can be used as a means of instructing animals to do certain things, such as calling cows to a barn.

A primary objective of the present invention is to construct a whistle of superior quality than previously constructed whistles that are able to produce an extremely loud high pitched shrill sound.

Another objective of the present invention is to construct a whistle which can be readily manufactured from either a permanent type of material, such as plastic, or can be manufactured from an edible material such as a hard candy.

Another objective of the present invention is to construct a whistle which can be manufactured inexpensively and thereby sold to the ultimate consumer at an inexpensive price.

The whistle of the present invention is constructed of a body which has a top wall and a bottom wall which are interconnected by a sidewall. An air entry through hole is formed between the top wall and the bottom wall with this air entry through hole being located directly adjacent the sidewall. Formed within the body is an air exhaust chamber which is tapered and has straight walls connected between a narrow tip and a widened base. The air entry through hole connects with the narrowed tip. The widened base forms an air exhaust opening within the top wall. The air exhaust chamber is slantingly located within the body permitting a support stick to be mounted within the body. The portion of the body including the air entry hole is to be located within a mouth of a user, and by forcing air into the air entry opening and into the air exhaust chamber a high pitched shrill sound is produced.

BRIEF DESCRIPTION OF THE DRAWING

FIG. 1 is a top plan elevational view of the whistle of the present invention; and FIG. 2 is a cross-sectional view taken along line 2—2 of FIG. 1.

DETAILED DESCRIPTION OF THE PREFERRED EMBODIMENT

Referring particularly to the drawing, there is shown in FIG. 1 the whistle 10 of this invention which is composed of a body 12 which is to be constructed of a plastic or any hard, rigid material. One desirable type of material would be a hard candy which would make the body 12 edibles The body 12 would preferably be mounted on a support stick 14.

The support stick 14 is elongated and cylindrical with one end of the support stick 14 being imbedded within a recessed hole 16 formed within the body 12. The support stick 14 could be constructed of wood, plastic, paper or any other non-edible rigid material. It is intended that the support stick 14 be held within the user's hand when operating of the whistle 10 and consuming of the body 12 if the body 12 is constructed of an edible material.

The body 12 includes a top wall 18 and a bottom wall 20. Connecting between the top wall 18 and the bottom wall 20 is a sidewall 22. The sidewall 22 happens to be shown as being circular, but it is considered to be within the scope of this invention that other configurations of sidewalls 22 could be used. Also, the top wall 18 is shown to be planer as well as bottom wall 20 with top wall 18 being parallel to bottom wall 20. However, it is considered to be within the scope of this invention that the top wall 18 could be other than planer the same is true for the bottom wall 20. Also the top wall 18 need not be precisely parallel to the bottom wall 20. It is to be understood that normally the whistle 10 will be constructed from a liquid material which is to be poured into a mold within which is mounted the stick 14. Appropriate inserts would be placed within the mold to create the through hole 24 and the air exhaust chamber 26.

The air exhaust chamber 26, in referring particularly to FIG. 2 of the drawing, is shown to be mounted within the body 12 in a slanted configuration, that is non-parallel to the top wall 18 and the bottom wall 20. The reason for this is so that the air exhaust opening 28 will not interfere with the portion of the stick 14 that is mounted within the body 12. The air exhaust opening 28 is of a widened configuration as is shown in FIG. 1. Through the air exhaust opening 28, the air is to be exhausted into the ambient. The air exhaust chamber 26 is shaped by being tapered having straight walls with it being discovered that this shape is most effective in producing the desired high pitched shrill sound. The inner portion of the air exhaust chamber 26 is formed into a narrowed tip 30. This narrowed tip 30 connects with the through opening 24. It has also been found that if the diameter X of the air entry through hole 24 is about one-eighth inch, that this seems to produce the maximum desired shrill sound. Also, the thickness Y of the air exhaust chamber 26 at the has straight walls tip 30 need be about one-eighth inch in order to produce again the most desired shrill sound. The thicknesses of the air exhaust chamber 26 at the air exhaust opening 28 should be about 5/32 of an inch which means that the air exhaust chamber 26 is tapered with the narrowest portion of the taper being at the narrowed tip 30 and the widest portion being at the air exhaust opening 28. Again, this tapered configuration seems to assist in producing the most desirable high pitched shrill sound.

The whistle 10 of this invention is to be used with the air exhaust opening 28 facing in an outward direction and it being located exteriorly of the mouth of the user. The user's lips are to be placed on both the top surface 18 and the bottom surface 20 forming a sealing arrangement therebetween so that when air is forced from the user's mouth, the only exit point is through the air entry through hole 24. This air will then pass into the air exhaust chamber 26 and exit the whistle body 12 through the air exhaust opening 28 into the ambient. The user is to work his or her tongue in conjunction with the through hole 24 in order to achieve the desired whistle sound. If the whistle body 12 is constructed of an edible material, as the whistle body is consumed as by melting, the through hole 24 will enlarge slightly. This will result in the production of a slightly different sound, and as further consumption occurs, the hole 24 will further enlarge still producing a further different sound.

What is claimed is:

1. A whistle comprising:

a body having a top wall and a bottom wall interconnected by a sidewall, an air entry hole comprising a through hole extending between said top wall and said bottom wall, said air entry hole being located directly adjacent said sidewall; and an air exhaust chamber formed within said body, said air exhaust chamber being tapered having straight walls, said air exhaust chamber triangularly shaped having a narrowed tip and a widened base, said air entry hole connecting with said narrowed tip, said widened base connecting with said top wall forming an air exhaust opening, whereby said body, including said air entry hole, is to be placed into a mouth of a user and by forcing air through said air entry opening into said air exhaust chamber a high pitched shrill sound is produced.

2. The whistle as defined in claim 1 wherein:

said body being mounted on a supporting stick with said air exhaust chamber being located to not interfere with said stick.

3. The whistle as defined in claim 1 wherein:

said top wall being parallel to said bottom wall.

4. The whistle as defined in claim 1 wherein:

said sidewall being circular.

5. The whistle as defined in claim 1 wherein:

said air entry hole being one-eighth inch in diameter.

6. The whistle as defined in claim 1 wherein:

said air exhaust chamber being angularly located relative to said top wall.

7. The whistle as defined in claim 1 wherein:

the thickness of said air exhaust chamber at said narrowed tip being approximately one-eighth inch.

* * * * *